Patented Aug. 23, 1949

2,480,071

UNITED STATES PATENT OFFICE 2,480,071

MAKING NAPHTHOQUINONES

William M. Ziegler, Clementon, N. J.

No Drawing. Application March 8, 1946,
Serial No. 653,167

4 Claims. (Cl. 260—396)

This invention relates to processes for the production of certain alkyl naphthoquinones, is more particularly concerned with a method for the oxidation of 1-hydroxy-2 - ($C_nH_{2n+1}$) - 4-amino-naphthalene to 2-($C_nH_{2n+1}$)-1,4-naphthoquinone, wherein "$n$" represents an integer from 4 to 12, inclusive, and is specifically concerned with novel compounds so obtained.

It has been suggetsed that hypertension existing in cases of renal ischemia may be due to the formation of pressor amines in the kidneys. This formation of pressor amines is caused by faulty metabolism of certain amino acids. Normally, these pressor amines are deaminized by amino enzymes and are thus made inactive. However, in the case of an ischemic kidney, the enzymes are inactive and the pressor amines accumulate and may cause hypertension. It has been shown that certain quinones, 2-alkyl - 1,4 - naphthoquinones, for example, are capable of inactivating pressor amines, and are useful in effectively reducing the blood pressure in hypersensitive individuals.

It is among the objects of the present invention to provide a procedure for the production of certain alkyl naphthoquinones. It is a further object of the invention to provide a novel group of compounds useful in the mitigation of hypertension and as chemical intermediates.

I have found that I am able to produce a 2-alkyl - 1,4 - naphthoquinone by the controlled oxidation of a 1-hydroxy-2-alkyl-4-amino-naphthalene. The oxidation can readily and effectively be accomplished by mixing an aqueous solution of an oxidizing agent, such as aqueous chromic anhydride, with an acidulated 1-hydroxy-2-alkyl - 4 - amino-naphthalene. The substituted naphthalene may be acidified with dilute aqueous sulfuric or acetic acid, for example. A water soluble ketone such as acetone or methylethyl ketone, for example, may be employed as a reaction medium. The mixing of the reactants may be carried out in any convenient manner, the final ratio of the reactants employed preferably being about one mole of oxidizing agent such as aqueous chromic anhydride to each mole of 1-hydroxy-2-alkyl-4-amino-naphthalene. The temperature of the reaction mixture is maintained at about room temperature or somewhat thereabove, say up to about 50 degrees centigrade. It is preferred that the temperature of the reaction mixture be maintained in a range between about 30 and about 35 degrees centigrade. The reaction is somewhat exothermic and cooling may be necessary to maintain the desired temperature.

The following examples illustrate my invention but are not to be construed as limiting the same to the specific procedure shown:

Example 1

Ninety grams of 1-hydroxy-2-butyl-4-amino-naphthalene dissolved in one liter of acetone, was acidified with 10 per cent sulfuric acid and was placed into a stainless steel vessel provided with a cooling coil and a stirrer. Forty grams of chromic anhydride ($CrO_3$), as a 10 per cent aqueous solution at room temperature was added to the above-mentioned components at room temperature. The reaction was exothermic and the temperature within the reaction was maintained between 30 and 35 degrees centigrade by circulation of water through the cooling coil. The reaction product was withdrawn from the vessel and 76.5 grams of a 2-butyl-1,4-naphthoquinone, having a melting point of 46–47 degrees centigrade was recovered. This represented a yield of approximately 85 per cent of theory.

Example 2

To 100 grams of 1-hydroxy-2-octyl-4-amino-naphthalene dissolved in one liter of acetone acidified with 10 per cent sulfuric acid, and placed in the reaction vessel described in Example 1, 40 grams of chromic anhydride, as a 10 per cent solution, was added. The reaction was carried out in the same manner and under the same conditions as shown in Example 1. The 2-octyl-1,4-naphthoquinone produced had a melting point of 58.5–60 degrees centigrade and was obtained in a yield of 83 per cent of theory.

Example 3

To 125 grams of 1-hydroxy-2-dodecyl-4-amino-naphthalene dissolved in 1250 cubic centimeters of acetone and acidified with 10 per cent sulfuric acid and was placed into the reaction vessel described in Example 1, forty grams of chromic anhydride, as a 10 per cent solution, was added. The reaction was carried out in the same manner and under the same conditions as shown in Example 1. The 2-dodecyl-1,4-naphthoquinone produced had a melting point of 70–71 degrees centigrade and was obtained in a yield of 77 per cent of theory.

While I have shown examples of the production of representative 2-alkyl-1,4-naphthoquinones I have in similar manner produced in yields above eighty per cent of theory the following compounds: 2-normalamyl-1,4-naphthoquinone, having a melting point of 33.5–35 degrees centigrade; 2-isoamyl-1,4-naphthoquinone, melting at 50–51 degrees centigrade; 2-hexyl-1,4-naphthoquinone, having a melting point of 51–52 degrees centigrade; 2-heptyl-1,4-naphthoquinone, having a melting point of 47.5–48.5 degrees centigrade; 2-nonyl-1,4-naphthoquinone, having a melting point of 46–47 degrees centigrade; and, 2-decyl-1,4-naphthoquinone, having a melting point of 64–65 degrees centigrade.

The compounds of the formula: $2\text{-}(C_nH_{2n+1})\text{-}1,4$-naphthoquinone, wherein "$n$" represents an integer from 5 to 12, inclusive, have been found especially useful in effecting a lowering of blood pressure in hypersensitive individuals.

The alkyl group in the compounds obtainable by the process herein described and claimed may be straight or branched in configuration, as above illustrated, depending upon the starting compound employed.

I claim:

1. The method which includes the steps of: reacting an acidulated 1-hydroxy-2-alkyl-4-amino-naphthalene having the general formula 1-hydroxy-2-$(C_nH_{2n+1})$-4-amino-naphthalene, wherein "$n$" is an integer from 4 to 12, inclusive, with chromic anhydride in the presence of a water-soluble ketone while maintaining the temperature of the reaction mixture in a range between about room temperature and about 50 degrees centigrade; and, separating a 2-alkyl-1,4-naphthoquinone from the reaction product.

2. The method which includes the steps of: reacting a 1-hydroxy-2-alkyl-4-amino-naphthalene having the general formula 1-hydroxy-2-$(C_nH_{2n+1})$-4-amino-naphthalene, wherein "$n$" is an integer from 4 to 12, inclusive, with chromic anhydride in the presence of sulfuric acid and a water soluble ketone in a ratio of about one mole of chromic anhydride to each mole of 1-hydroxy-2-alkyl-4-amino-naphthalene; and, separating a 2-alkyl-1,4-naphthoquinone from the reaction product.

3. The method which includes the steps of: reacting a 1-hydroxy-2-alkyl-4-amino-naphthalene having the general formula 1-hydroxy-2-$(C_nH_{2n+1})$-4-amino-naphthalene, wherein "$n$" is an integer from 4 to 12, inclusive, with chromic anhydride, in the presence of sulfuric acid and a water soluble ketone while maintaining the temperature of the reaction mixture in a range between about room temperature and about 50 degrees centigrade, in a ratio of about one mole of chromic anhydride to each mole of 1-hydroxy-2-alkyl-4-amino-naphthalene; and separating a 2-alkyl-1,4-naphthoquinone from the reaction product.

4. The method according to claim 3 wherein the reaction is maintained at a temperature between about 30 and about 35 degrees centigrade.

WILLIAM M. ZIEGLER.

REFERENCES CITED

The following references are of record in the file of this patent:

Liebermann, Ber. Deut. Chem., vol. 14, pp. 1311, 1795–1796 (1881).

Conant et al., Organic Syntheses, vol. 5, pp. 79–82 "1,4-Naphthoquinone" (1925).

Fieser et al., Organic Syntheses, Collected vol. 1, 2nd ed. pp. 383–384, "1,4-Naphthoquinone" (1941).

Bromby, Jour. Chem. Soc., London, 1943, pp. 144–145.